UNITED STATES PATENT OFFICE.

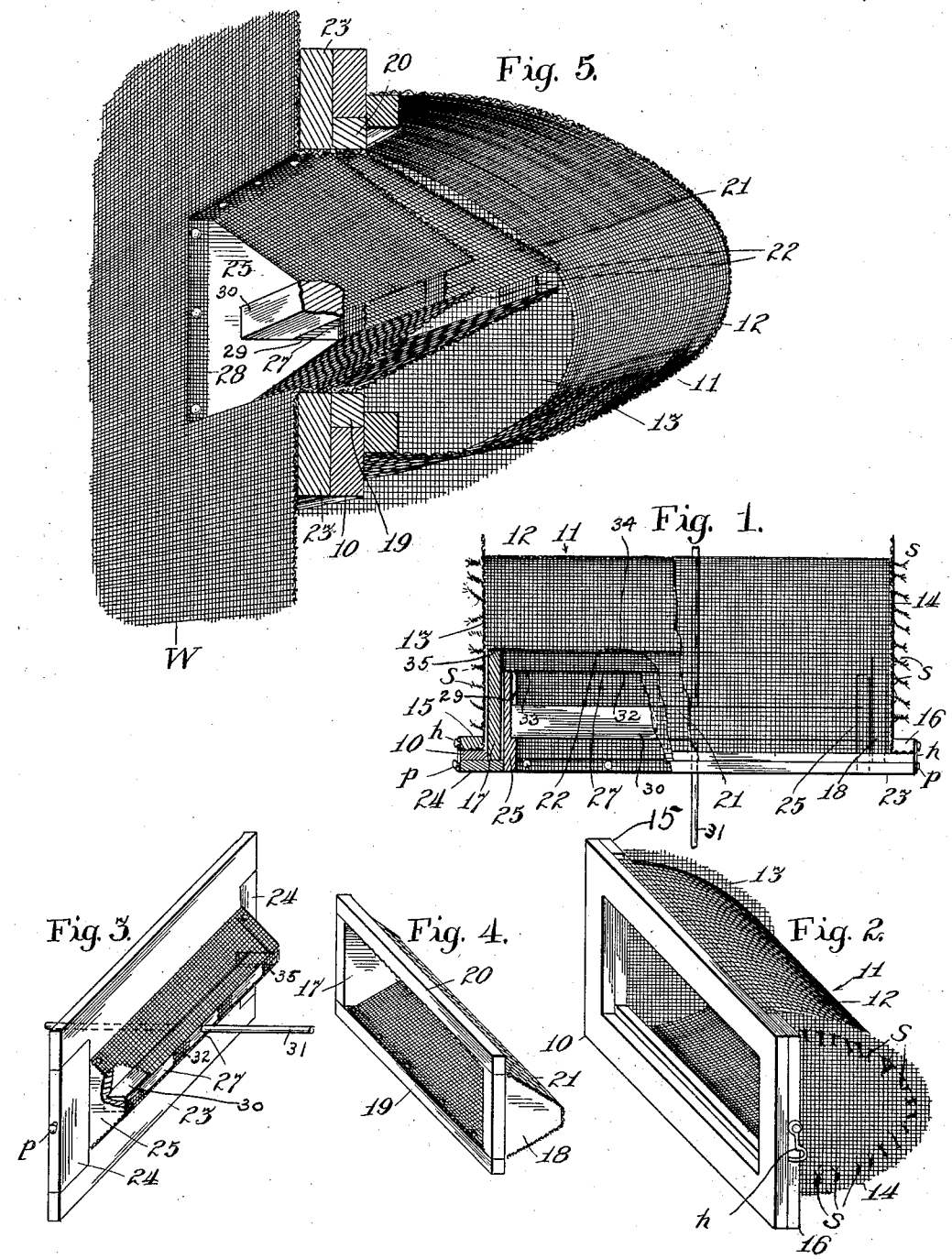

CHARLES H. BATH, OF ANCON, CANAL ZONE.

INSECT-TRAP.

1,082,489. Specification of Letters Patent. Patented Dec. 30, 1913.

Application filed August 9, 1912. Serial No. 714,174.

*To all whom it may concern:*

Be it known that I, CHARLES H. BATH, residing at Ancon, Canal Zone, Panama, have invented certain new and useful Improvements in Insect-Traps, of which the following is a specification.

My invention relates to insect traps and particularly to an improved form of trap for catching mosquitos.

I am aware there are many forms of prior traps but none of them are suitable for the main purpose for which my trap is designed, namely, for catching mosquitos.

In the Canal Zone, Panama, the sanitary department is making a close study of mosquitos and other insects, particularly the malaria and other germ bearing kind, and for this research work a great number of mosquitos must be caught. In earlier forms of trap some kind of bait must be placed in the trap to attract insects and these traps are set within rooms or receptacles which the insects must first enter before they reach the trap. In these forms of traps, the occupants of the room in which the trap is placed are therefore subjected to attack. Furthermore, it has been discovered that the only thing that will attract mosquitos is human scent, so that the ordinary forms of trap are useless for protection against mosquitos.

The principal object of my invention is, therefore, to provide an improved form of trap and such application thereof that human scent may act to lure mosquitos into the trap without subjecting the inhabitants of a room to attack.

My improved trap is constructed to be applied over an opening in the wall of a room so that insects attempting to enter the opening will be caught in the trap, such opening being best at the top of a room to where the scent rises. The opening is also made quite large so that the insects will enter the opening in preference to seeking more difficult entrance. In this way great numbers of insects are quickly caught without subjecting the inhabitants to attack. The trap can, of course, also be placed over the outside of the opening so that insects already within the room can find ready outlet, to be trapped. When placed at the outside of refuse boxes or pits in which the insects are hatched, the light at the outside of the trap will attract them and lure them into the trap. For catching moths and the like, artificial light is usually placed in suitable position to lure the insects into the trap.

Another object of the invention is to provide such construction that the trap can be readily taken apart for cleaning and disinfecting purposes and for removing the accumulated insects.

One construction for carrying out the above and other features is clearly illustrated on the accompanying drawings in which—

Figure 1 is the side elevational view of a trap with part thereof in vertical section; Fig. 2 is a perspective view of the main frame or cage; Fig. 3 is a perspective view of the outer entrance frame structure; Fig. 4, is a perspective view of an intermediate frame structure; Fig. 5 is a perspective view in transverse section.

Describing first the construction of the trap, a main housing or cage structure comprises a rectangular frame 10 to which is secured the wire structure or caging 11, the sides of this structure being, as shown, formed of one piece of wire screen or gauze 12 and the ends 13 and 14 being pieces of wire screen or gauze secured to the side frame 12 by receiving through its meshes the strands S which are then twisted together as indicated. The inner edges of the side and end parts are held against the frame 10 by side and end strips 15 and 16 respectively.

An intermediate inlet structure shown in Fig. 4, comprises conical end walls 17 and 18 connected at their bases by side bars 19 and 20, a wire screen or gauze 21 being secured to the edges of the conical end walls and to the side bars 19 and 20. Along the apex of the screen the sections are cut out to leave inlet passageways 22 to the interior of the cage 12. This intermediate structure is adapted to fit into the cage structure as indicated in Figs. 1 and 5, the side strips 15 of the cage structure extending slightly beyond the side walls of the frame 10 to form abutment for the side bars 19 and 20 of the intermediate structure.

An outer inlet structure shown in Fig. 3 comprises a rectangular frame 23 from whose end walls 24 the conical pieces 25 extend to whose edge wire screen or gauze is secured, the gauze along the apex being cut away to leave the passageways 27. When the parts are to be assembled, the intermediate structure is fitted into the main structure and the frame 23 of the outer structure is applied to the frame 10 of the main structure and held to such frame by suitable means as for example, hooks $h$ and pins $p$ indicated. The assembled structure can be placed in any position so that insects will find entrance into the outer inlet structure, the insects passing along the conical walls and then through passageways 27 of this structure. From here the insects will pass into the intermediate inlet frame and out of the passageways 22 thereof and into the main structure or cage 14. The operation of the conical inlet frame is well understood in the art; insects readily enter at the bases and leave through the apex passageways, but refuse to enter the frames at the apex. The insects eventually land in the main structure or cage 14 and can be readily removed therefrom after the intermediate and outer inlet structures have been removed.

In practice the structure is placed with its inlet about a suitable opening as, for example, an opening in the window screen or the wall of a room or receptacle. In Fig. 5 the trap is shown as applied about an opening in the window screen W, the edges 28 adjacent the screen opening being turned into and fastened to the end 23. If the frame is applied to a wall, it may be nailed or otherwise secured over the opening in the wall. If it is desired to use the trap to collect insects for scientific and statistical purposes, it is placed at the inside of a room so that the insects attempting to enter the room will be trapped. The human scent in the room will quickly attract mosquitos, and, as this scent rises, the opening is best placed at the top of the room. The opening is made quite large so that insects will enter the opening when attracted by light or human scent, in preference to seeking more difficult entrance. For catching mosquitos, human scent can thus be used without subjecting the human beings to attack.

Where the trap is to be used for catching insects in refuse boxes, pits, or the like, it is placed at the outside over a suitable opening so that light will attract the insects and lure them into the trap. In this manner the adult insects and the newly hatched insects will be caught. In the same manner if a trap is to be used for catching insects already within a room, it is placed at the outside over a suitable opening.

After a trap has been filled, the cage can readily be removed by unfastening the hooks $h$ and the collected insects are available for scientific purposes or can be readily destroyed and the trap parts disinfected. In order that inlet or outlet through the wall opening may be closed to insects upon removal of the cage, suitable means may be provided for closing such opening. As shown, the end blocks 25 on frame 23 have the grooves 29 in which the ends of a bar 30 may slide to open or close the passageways 27 at the apex of the conical screen member. To manipulate this bar, a wire or rod 31 may extend therefrom so that the block may be readily shifted to close the passageways before the cage is removed and to reopen them when the cage is applied.

To better prevent escape of insects after once having entered the intermediate structure or the cage, the screen sections 32 and 33 are relatively offset, that is, the sections 33 of the intermediate structure are in line with the passageways 27 of the inner structure. Also to prevent return of insects at the ends of these structures, screen sections 34 and 35 are left to extend a distance inwardly from the conical end blocks.

I thus provide a trap which is of simple construction and which is adaptable for catching many different kinds of insects and which is particularly adaptable for trapping mosquitos.

As changes and modifications are possible which would still come within the scope of my invention, I do not desire to be limited to the precise construction and arrangement shown and described, and I claim the following:

1. In an insect trap, the combination of a conical inlet structure adapted to be applied about an inlet opening and a receiving structure having a rectangular supporting frame adapted to be applied about said inlet structure, a main wall of a single piece of screen material secured at its edges to the side walls of the supporting frame and the end walls of said receiving structure being of screen material and extending from the ends of said supporting frame, and strands of the main wall and end walls being interlaced to secure the walls together.

2. In an insect trap, the combination of a conical inlet structure adapted to be applied about an inlet opening and a receiving structure having a rectangular supporting frame adapted to be applied about said inlet structure, a main wall of a single piece of screen material secured at its edges to the side walls of the supporting frame and the end walls of said receiving structure being of screen material and extending from the ends of said supporting frame, the ends of the strands of the main wall extending through the end walls and then twisted together to thus secure the end walls securely to the main wall.

In witness whereof, I hereunto subscribe my name this 29th day of July, A. D. 1912.

CHARLES H. BATH.

Witnesses:
J. A. LE PRINCE,
A. N. BISHOP.

Copies of this patent may be obtained for five cents each, by addressing the "Commissioner of Patents, Washington, D. C."